United States Patent
Al-Sayed Wahba

(10) Patent No.: US 10,386,261 B2
(45) Date of Patent: Aug. 20, 2019

(54) HIGH REPETITION RATE THERMOMETRY SYSTEM AND METHOD

(71) Applicant: KING ABDULLAH UNIVERSITY OF SCIENCE AND TECHNOLOGY, Thuwal (SA)

(72) Inventor: Osama Mohammad Al-Sayed Wahba, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/552,423

(22) Filed: Nov. 24, 2014

(65) Prior Publication Data

US 2015/0153243 A1 Jun. 4, 2015

Related U.S. Application Data

(60) Provisional application No. 61/908,440, filed on Nov. 25, 2013.

(51) Int. Cl.
*G01M 3/24* (2006.01)
*G01M 3/00* (2006.01)
(Continued)

(52) U.S. Cl.
CPC .............. *G01M 3/243* (2013.01); *F17D 5/005* (2013.01); *F17D 5/06* (2013.01); *G01M 3/00* (2013.01); *G01M 3/24* (2013.01)

(58) Field of Classification Search
CPC .......... G01M 3/00; G01M 3/24; G01M 3/243; F17D 5/06
(Continued)

(56) References Cited

U.S. PATENT DOCUMENTS 4,289,019 A * 9/1981 Claytor ................. G01M 3/243
702/51
4,858,462 A * 8/1989 Coulter ................. G01M 3/243
73/40.5 A
(Continued)

OTHER PUBLICATIONS

Examination Report in corresponding Cooperation Council for the Arab States of the Gulf Application No. GC 2014-28380 dated May 9, 2016. References D1, D2 and D4 were already made of record by the Examiner in an Office Action dated Jul. 5, 2016.
(Continued)

*Primary Examiner* — Peter J Macchiarolo
*Assistant Examiner* — Monica S Young
(74) *Attorney, Agent, or Firm* — Patent Portfolio Builders, PLLC

(57) ABSTRACT

An intelligent utility monitoring method and system for monitoring a network of utility lines can include a data collector configured to receive acoustic data based on real-time measurements of the utility line, an events historian configured store the acoustic data, an alarm and events (A&E) manager, a server, and an interface. The A&E manager can be configured to store alarm and even data. The A&E data can be based on analysis of the acoustic data. The interface can be configured to provide output based on the acoustic data and on the A&E data. The server can be configured to store the acoustic data and the A&E data. The server can further be configured to provide a computer network for at least the events historian, the A&E manager, and the interface.

15 Claims, 14 Drawing Sheets

(51) Int. Cl.
*F17D 5/06* (2006.01)
*F17D 5/00* (2006.01)

(58) Field of Classification Search
USPC .................................................. 73/4
See application file for complete search history.

(56) References Cited

U.S. PATENT DOCUMENTS

| | | | | |
|---|---|---|---|---|
| 4,962,358 A * | 10/1990 | Svetanoff | ............ | G01R 29/0835 324/627 |
| 5,333,501 A * | 8/1994 | Okada | .................. | G01M 3/243 73/40.5 A |
| 5,974,862 A * | 11/1999 | Lander | ................. | G01M 3/243 702/51 |
| 6,389,881 B1 * | 5/2002 | Yang | .................... | G01M 3/243 73/40.5 A |
| 6,453,247 B1 * | 9/2002 | Hunaidi | ................ | G01M 3/243 702/51 |
| 6,611,150 B1 * | 8/2003 | Stevens | ................ | G01R 31/025 324/613 |
| 2004/0236620 A1 * | 11/2004 | Chauhan | ................ | G06Q 10/06 705/7.14 |
| 2006/0191341 A1 * | 8/2006 | Olesen | .................. | G01M 3/243 73/592 |
| 2008/0314122 A1 * | 12/2008 | Hunaidi | ................ | G01M 3/243 73/40.5 A |
| 2009/0250125 A1 * | 10/2009 | Howitt | ..................... | E03F 7/00 137/551 |
| 2009/0322544 A1 * | 12/2009 | McDowell | ............... | F17D 5/06 340/605 |
| 2011/0093220 A1 * | 4/2011 | Yang | ..................... | G01M 3/243 702/51 |
| 2011/0120209 A1 * | 5/2011 | Rose | ..................... | G01M 3/243 73/1.82 |
| 2011/0282596 A1 * | 11/2011 | Patel | ....................... | F23K 5/007 702/48 |
| 2012/0007744 A1 * | 1/2012 | Pal | ......................... | G01M 3/243 340/605 |
| 2012/0285221 A1 * | 11/2012 | Al-Qahtani | ........... | G01M 3/246 73/40.5 A |
| 2012/0287749 A1 | 11/2012 | Kutlik et al. | | |
| 2014/0000347 A1 * | 1/2014 | Huseynov | ............... | G01M 3/24 73/40.5 A |
| 2014/0121999 A1 * | 5/2014 | Bracken | ................ | G01M 3/243 702/51 |
| 2015/0052979 A1 * | 2/2015 | Cho | ..................... | G01M 3/243 73/40.5 A |
| 2015/0330863 A1 * | 11/2015 | Dotan | ....................... | F17D 5/06 702/51 |
| 2015/0331007 A1 * | 11/2015 | Giunta | ..................... | G01S 5/22 702/56 |
| 2015/0377693 A1 * | 12/2015 | Rose | ..................... | G01H 11/06 73/658 |
| 2016/0011072 A1 * | 1/2016 | Hale | ........................ | G01M 3/24 702/48 |

OTHER PUBLICATIONS

GC Second Examination Report in related Application No. GC 2014-28380, dated Mar. 3, 2017 (All cited documents are already of record in this application).

* cited by examiner

| Message | Alarm Count |
|---|---|
| LSLL 0024I LOW LOW LEVEL | 223,758 |
| SWRO Premeat WTR pH D HI ALRM | 87,989 |
| VMS 0020C VA HIGH VAIBRATION | 76,177 |
| Treated Pump G20E DESCREPANCY | 51,268 |
| SWRO Premeat WTR CONDCT D HI ALRM | 29,841 |
| VMS 0001C VA HIGH VAIBRATION | 24,812 |
| VMS 0020B VA HIGH VAIBRATION | 17,316 |
| SWRO Premeat WTR pH A HI ALRM | 14,793 |
| PSL 0095E B LOW PRESSURE | 12,118 |
| SWRO Premeat WTR CONDCT B HI ALRM | 6,320 |
| SWRO Premeat WTR CONDCT C HI ALRM | 5,626 |
| PSL 0095E A LOW PRESSURE | 5,400 |
| BWRO Outlet Conductivity A HI ALRM | 4,962 |
| [PLCTAGSREV1]B_S_WRO_AOV_313A_RESET_SCADA | 4,722 |
| VMS 0001B VA HIGH VAIBRATION | 3,794 |
| LSH 0021A HIGHLEVEL | 2,982 |
| VMS 0020A VA HIGH VAIBRATION | 2,856 |
| VMS 0020D VA HIGH VAIBRATION | 2,654 |
| [PLCTAGSREV1]B_S_WRO_AOV_313A_CLOS_CMND_SCADA | 2,418 |
| [PLCTAGSREV1]B_S_WRO_AOV_313A_OPN_CMND_SCADA | 2,358 |

Figure 13

Pipe / Rupture with vibration & pressure wave

HIGH REPETITION RATE THERMOMETRY SYSTEM AND METHOD

PRIORITY CLAIM

This application claims priority to U.S. Provisional Application No. 61/908,440, filed Nov. 25, 2013, which is incorporated by reference in its entirety.

TECHNICAL FIELD

The present invention is directed to a sensor system and method for intelligently monitoring public utilities.

BACKGROUND

A reliable supply of potable water is a basic requirement for human life. This need can be acute in urban areas and in regions of the world where there is no regular or constant water supply, such as arid and coastal regions. In some areas pipelines and aquifers are lacking or insufficient and water must be brought by vehicles, particularly trucks. Water may need to be imported by vehicle for other reasons as well, for example where water has been contaminated by hydraulic fracturing. In such areas, customers are heavily dependent on water truck services to secure their needs. Distributing water supplies via trucks is a very slow, unsafe, environmentally-unfriendly, and costly process. Customers may not get requested water supplies in a timely manner.

Even where underground pipelines are available, they may be inefficient. The rate of water leakage from underground pipes in Asia-Pacific countries, as well as most European countries, can be as high as a quarter of water supplied through such pipes.

These deficiencies are very costly for both the water utility, which directly loses money, and the consumer who is indirectly penalized through increases in water rates. The customer also suffers inconvenience at best and unhealthful conditions at worse.

SUMMARY

In an aspect, an intelligent utility monitoring system for detection of leaks in a pressurized line can include at least two acoustic sensors, an analyzer, and a processor. The acoustic sensors can be in contact with the pressurized line. Each of the two acoustic sensors can be configured to detect a noise level in the line. The analyzer can be configured to determine the noise level within the pressurized line. The processor can include a correlator configured to determine a location of a leak in the pressurized line based on correlation of the noise.

In some embodiments, the analyzer can be configured to discriminate against noise below 10 dB. The analyzer can also be configured to discriminate against noise above 40 dB.

In other embodiments, each of the at least two acoustic sensors can have a wireless transmitter configured to communicate wirelessly with the correlator.

In yet other embodiments, the system can further include a means for imparting an acoustic impulse to the pressurized line. The processor can configured to compare the acoustic impulse with a partially reflected acoustic signal. The processor can also, or in the alternative, be configured to compare the acoustic impulse with a transmitted acoustic signal.

In another aspect, an intelligent utility monitoring system for monitoring a network of utility lines can include a data collector, an events historian, an alarm and event manager, a server, and an interface. The data collector can be configured to receive acoustic data based on real-time measurements of the utility line. The events historian can be configured store the acoustic data. The alarm and event manager can be configured to store alarm and/or even data. The alarm and/or event data can be based on analysis of the acoustic data. The interface can be configured to provide one or more outputs, which can be based on the acoustic data and/or on the alarm and event data. The server can be configured to store the acoustic data and/or the alarm and event data. It can further be configured to provide a computer network for at least the events historian, the alarm and events manager, and/or the interface.

In some embodiments, the network of utility lines can include water pipes. In other embodiments, the network of utility lines can include gas pipes. In yet other embodiments, the network of utility lines can include wires. In some embodiments, the network of utility lines can include fuel and/or oil pipes. The data collector can be configured to receive flow rate data and pressure data. The data collector can also, or in the alternative, be configured to receive temperature data and/or vibration data.

In other embodiments, the system can further include at least two acoustic sensors, which can be in contact with the water pipes, an analyzer, and a correlator. Each of the at least two acoustic sensors can be configured to detect a noise level. The analyzer can be configured to determine the noise level within the lines. The correlator can be configured to determine a location of a fault, such as a leak, in the lines based on correlation of the noise.

In yet other embodiments, the analyzer can be configured to discriminate against noise below 10 dB or above 40 dB. Each of the two acoustic sensors can have a wireless transmitter configured to communicate wirelessly with the correlator. The system can further include a means for imparting an acoustic impulse to the lines. The server can be further configured to compare the acoustic impulse with a partially reflected acoustic signal. The server can also, or in the alternative, be configured to compare the acoustic impulse with a transmitted acoustic signal.

In an aspect, a method of intelligently monitoring a utility line can include the steps of transmitting an acoustic noise signal along the utility line, measuring a first detection signal with a first sensor and a second detection signal with a second detector, correlating the first and second detection signals and generating leak data, and sending the leak data to a supervisory control and data acquisition system.

In some embodiments, the method can further include generating alarm and event data and filtering out false alarms based on predetermined criteria. The predetermined criteria can include associating valid alarms with noise in the range of 10 dB to 40 dB.

In other embodiments, the method can further include correlating leak data with one or more locations on a digital map. The digital map can include 360° images for each location. The one or more locations can include surface location data and depth location data.

In yet other embodiments, the method can further include automatically generating an optimized response plan based on the leak data and on the digital map. The method can further include logging leak data and generating predictions of potential leaks based on logged leak data.

In yet other embodiments, the method can further include the interfacing to ERP system to automatically create maintenance work orders for the leaked portion of the underground network. This will ensure a timely response to do the rectification and will eventually avail full repair history record for all system components.

Other aspects, embodiments, and features will be apparent from the following description, the drawings, and the claims.

BRIEF DESCRIPTION OF THE DRAWINGS

The following drawings form part of the present specification and are included to further demonstrate certain aspects of systems and methods described herein, which may be better understood by reference to one or more of these drawings in combination with the detailed description of specific embodiments presented herein.

FIG. 13 depicts an exemplary interface showing alarm counts.

DETAILED DESCRIPTION

Figure 1:
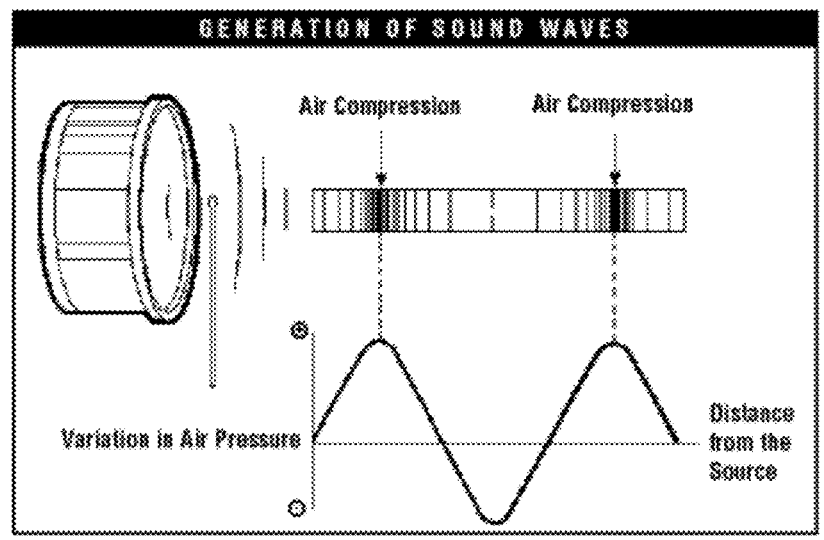
FIG. 1 depicts pressure variations traveling through air as sound waves.

Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

There is no completely satisfactory method for finding leaks or unauthorized use of water at present without costly meter reading and exact quantification of flows. Although there have been methods in the past that can quantify and locate leaks, they have only really been for single long pipelines rather than networked systems.

Today's business variables change minute by minute, and even second by second, the operations of the typical business must be similarly managed. For example, energy prices that were a business constant a few years ago now fluctuate many times each day, sometimes several times an hour. The price of supplies and other commodities changes multiple times a day too, as do customer demands. Those customer demands, in areas where public utilities can be scarce, are increasing. Moreover, where one utility is scarce, for example potable water, other utilities such as gas, power, as well as sewage and waste removal, can also be difficult to provide. In some regions, these demands have become an alarming and pressing issue with regional booms in the number of new projects and population counts. Reasons for such problems can include: shortages in production and supplies; performance problems in existing distribution networks; inadequacies in maintenance support for productions plants and networks; construction deficiencies in overall systems; inadequate corrosion protection measures; unrealistically high consumption rates from the users; and the need invest in expansion projects in key but unrecognized areas. Moreover, there will always challenges meeting customer demands which are frequently rising due to previously committed high level of services and/or simply having high expectations from being part of a modern society.

A smart utility monitoring system, as presented herein, can be advantageous to, for example, public utility organizations to remain competitive and achieve sufficient customer satisfaction levels. Such systems can be particularly advantageous in open markets, such as Saudi Arabia, or anywhere where profits can be affected by productivity, customer response times, cost optimization, inventory control, and leak losses. Methods and systems herein provide advantages in leak detection, location, and correction in a proactive approach.

The intelligent utilities monitoring system (IUMS) described herein can be based on integrated systems that communicate homogeneously to provide solutions in the area of producing and distributing potable water. Embodiments of the IUMS can be implemented for monitoring and minimizing loss due to leaks in gas pipes, as well as fuel and/or oil pipes.

As will be further detailed, embodiments of the IUMS can be designed to collect, trend, analyze, and/or advise users regarding optimal approaches for managing infrastructure of a utility distribution network. The IUMS can assist in and/or manage water supply production, distribution, and maintenance. The IUMS can be implemented with a centralized monitoring control station and can be implemented so as to be accessed and/or controlled from any remote location, for example, via a closed-circuit or the Internet.

An IUMS embodiment can be integrated with enterprise resource planning (ERP) systems, geographic information systems (GIS), real-time process data analysis, real-time leakage data, and/or three-dimensional city modules together into one intelligent system. The IUMS can include several mix-and-match functionalities. For example, the IUMS can integrate wireless real-time 3D GIS monitoring of water production and/or distribution of all or some installed assets on round-the-clock (i.e. 24/7) basis. The system can include a wireless real-time 3D GIS representation of exact leak locations and/or the exact volume of leakage using, as well as provide GPS coordinates in real time.

Embodiments can boost maintenance and repair performance by, for example, dispatching response teams with precise maps showing the exact street location and excavation depth. This functionality can further include optimizing which equipment and response teams should be deployed in order to complete repairs efficiently. For example, if the location is in a field and the pipeline is near the surface or above ground, there would be no need to dispatch heavy excavation equipment. On the other hand, if the leak location is deep below an urban street without nearby service access, heavy equipment can be immediately dispatched without the need to first send engineers to survey the above the location.

The intelligent system can include smart physical verification of installed equipment, digital street maps with 360-degree images and GPS references which can be incorporated with utility networks. An interface can be implemented for plant maintenance, equipment, ticketing, and/or real-time systems auditing and maintenance performance. In addition, trending analysis can be incorporated to allow monitoring conditions, incidents, and performance both in real time and historical data. This functionality lends itself to graphical and charting capabilities against archived data for reports and presentation.

Another important functionality of IUMS embodiments can be real-time alarm and event analysis including chattering and predictable alarms, as well as quick identification and/or addressing of future potential problems through real-time viewing and automatic alarm filtering. Due in part to the relative low cost of digital storage, unlimited periods of on-line historical alarm records can be kept for analysis and event prediction.

Several business tools can be advantageously integrated with the smart system, such as a visualization interface for tracking key performance indicators (KPIs) and integrated controls that allow optimization of business needs in the moment. Optimize here can mean profitability, growth, or other business considerations or it can relate to physical parameters of the utility.

Further, IUMS embodiments can provide improved environmental quality controls, for example, by eliminating and/or minimizing leaks, keeping streets and buildings structurally sound, reducing contamination, and/or eliminating accumulation of hurtful insects. Further, IUMS embodiments can reduce property damage, legal liability, and/or insurance because of fewer main breaks and quicker response times to such events. Reduced risk accidents, traffic jams, slippage, etc. can also be achieved.

In an embodiment, the IUMS can include a cordless/wireless leak noise correlator (LNC) device. The LNC can include an electronic device used for leak detection in pressurized lines and/or pipes. Cordless transmitters can be positioned below ground, for example, in valve chambers with valve chamber closed. Acoustic sound sensors can be placed in contact with the pipe, at two or more points, to record sound emitted by a leak. Sound data can be processed through mathematical algorithms to determine the times it takes noise to travel from the leak to each sensors. The time taken to travel from the leak to each sensor can be extrapolated from, inter alia, the difference in time that each sensor detects the sound. Other methods can be used and since the distance between the sensors can be known in advance, timing information can be used to determine the location of the leak.

When a bursting event occurs, energy generated from the leak can be transmitted within the pipe through the water. Energy from the leak can also be transmitted through the pipe wall. Different pipes material types can contribute to the quality of leak noise. For example, steel, which is a relatively hard pipe material, can provide a strong signal. In generally descending order for transmitting a signal is: steel, ductile iron, copper, asbestos cement, lead, PVC, and polyethylene. The noise level can be utilized to determine if a leak is present. For example, if the noise is in the range 0 dB-10 dB, no leak occurred. On the other end of the spectrum, if the noise is in the range 40 dB-100 dB, the leak can generally be found with noise loggers or other methods. In between these ranges, i.e. in the range of 10 dB-40 dB, a leak even can be found with noise loggers, and correlation is generally required.

The IUMS method and apparatus can be developed to enable utilities authorities providing accurate, reliable, and/or continuous monitoring and analysis for the overall system. This data can be utilized to formulate solutions for utility problems beyond leak detection.

In the leak example, if the leak has enough pressure to break to the surface, once spotted can often be fixed shortly thereafter. The vast majority of leaks in networks, however, are sub surface and normally only identified when pressure loss or non-revenue water loss reaches noticeable levels. This can sometimes take months to identify and then fix. All too often, prior responses to such a problem would be to increase pumping pressure. Raising pressures to make up for such losses increases energy consumption and is wasteful. This rise in pressure can make leaking worse and can have adverse environmental impacts.

Figure 8:
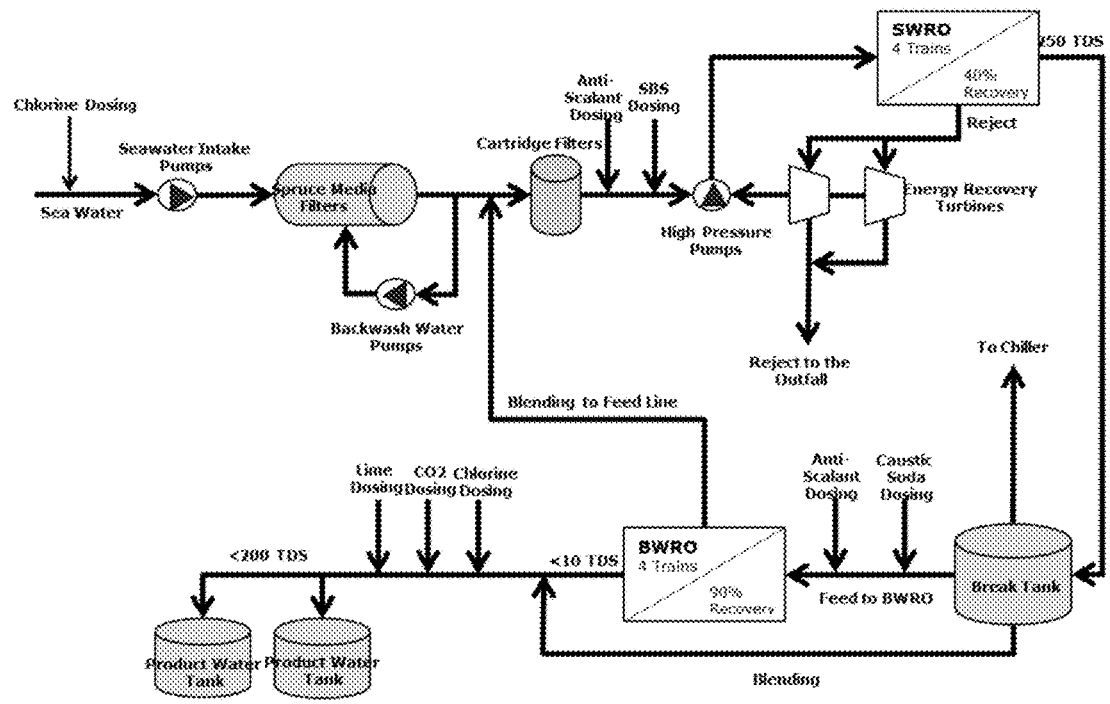
FIG. 8 depicts an exemplary schematic of a reverse osmosis plant.
Figure 9:
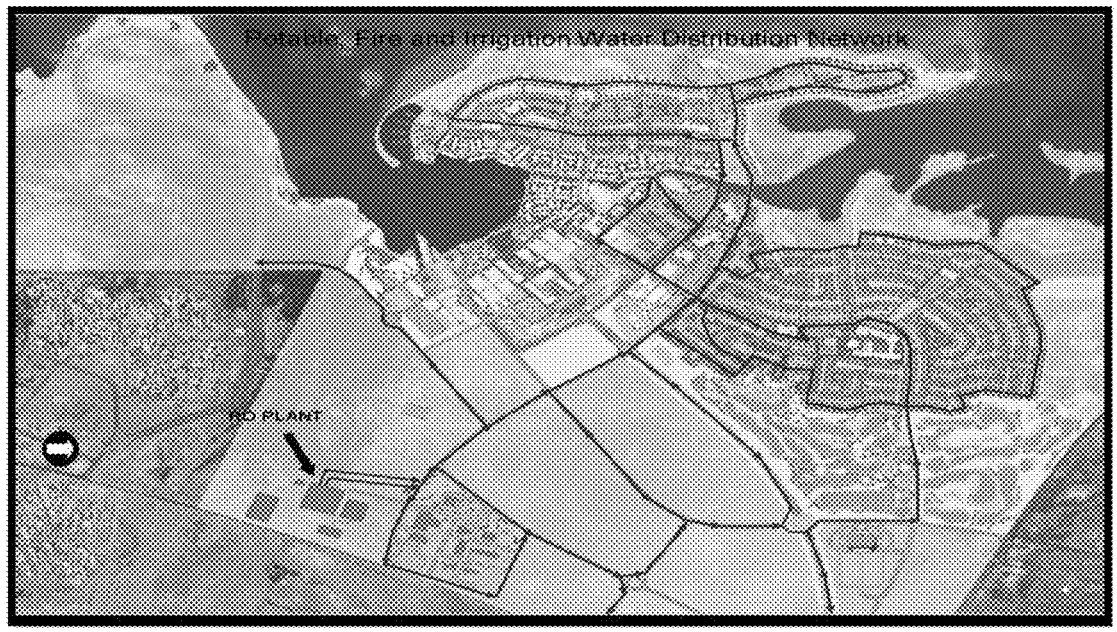
FIG. 9 depicts an aerial map with a superimposed pipeline network.
Figure 10:
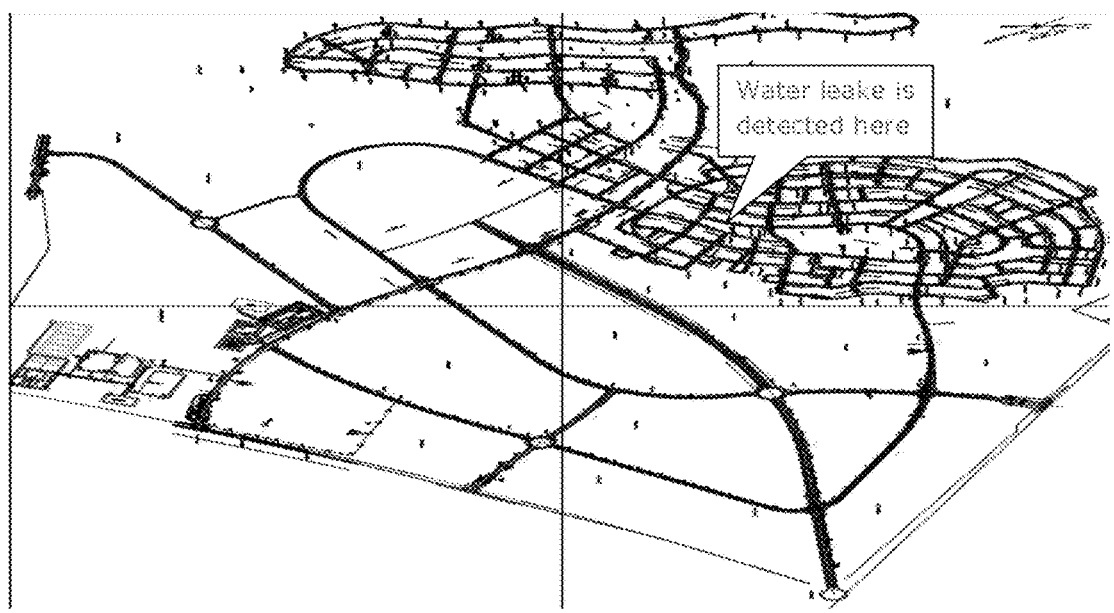
FIG. 10 is a digital representation of a town and pipeline network with an indication locating a leak in the system.

IUMS embodiments can monitor the whole process starting from the sea or other intake sources, production process, distribution services, maintenance performance auditing, and end-user consumption monitoring. The system can be implemented as a hybrid system that can utilize leak noise correlation sensors, PLCs, GIS representation interlocked with 360° digital imaging. The IUMS can be implemented in a reverse osmoses plant (RO). Such an implementation is shown in FIGS. 8 and 9. The system can be adjusted to be applicable for any utility provided services.

Correlation can be determined with the following formula.

$$L = D - (v \times T_d) \quad (1)$$

where L is the leak position (meters, m), v is the velocity of sound along the pipe (m/ms), D is the length of the pipe between detectors (m), and $T_d$ is the time delay (milliseconds, ms).

Some functionality of the IUMS can include monitoring and analyzing sound. Sound can be described as what we hear. In this sense, "we" can be a detector such as an electromechanical transducer. Noise can generally be described as unwanted sound. However, in some applications, the detection and analysis of noise can be useful and/or wanted. The difference between sound and noise can depend upon the listener and the circumstances. As an example, certain music can be a pleasurable sound to one person and an annoying noise to another. Much as long exposure to loud sound or noise can be hazardous to a person's hearing, it can be hazardous to sensitive listening and/or detection equipment if exceeding designed parameters.

Sound is produced by vibrating objects that create pressure waves which travel through matter. To illustrate, imagine striking a drum surface with a stick. The drum surface vibrates back and forth. As it moves forward, it compresses air in contact with the surface. This creates a positive (higher) pressure. When the surface moves in the opposite direction, it creates a negative (lower) pressure by decompressing the air. Thus, as the drum surface vibrates, it can create alternating regions of higher and lower air pressure. These pressure variations travel through the air as sound waves as shown in FIG. 1. In gases, the higher the velocity of sound, the higher the pitch will generally be. The approximate velocity of sound in air and other media is given in Table 1.

TABLE 1

Approximate Speed of Sound in Common Materials

| Medium | Sound Speed (ft/s) | (m/s) |
|---|---|---|
| Air, dry (0° C. and 0.76 mm Hg) | 1,100 | 300 |
| Wood (soft—along the fiber) | 11,100 | 3,400 |
| Water (15° C.) | 4,700 | 1,400 |
| Concrete | 10,200 | 3,100 |
| Steel | 16,000 | 5,000 |
| Lead | 3,700 | 1,200 |
| Glass | 18,500 | 5,500 |
| Hydrogen (0° C. and 0.76 m) | 4,100 | 1,260 |

The hearing mechanism of the ear, or detector, can sense the sound waves and convert them into information. Relatively loud sounds produce pressure fluctuations which are extremely small (1 in 10,000) compared to ambient air pressure (i.e., atmospheric pressure). The hearing mechanism in the ear is sensitive enough to detect even small pressure waves. Various properties of noise and/or sound can be measured, such as frequency, sound pressure, sound power, and/or time distribution.

Frequency is the rate at which the source produces sound waves, i.e. complete cycles of high and low pressure regions. In other words, frequency is the number of times per second that a vibrating body completes one cycle of motion. A unit for measuring frequency can be the hertz (Hz). One hertz is defined as one per second, or one cycle per second.

FIG. 1 shows one cycle from an air compression to a minimum pressure and back to a maximum pressure. Low pitched or bass sounds have low frequencies. High-pitched or treble sounds have high frequencies. For context, a healthy, young person can hear sounds with frequencies from roughly 20 to 20,000 Hz, and the sound of human speech is mainly in the range 300 to 3,000 Hz.

Sound pressure is the amount of air pressure fluctuation a noise source creates. Loudness can be described in terms of the air pressure fluctuation. If the drum in the example of FIG. 1 is hit very lightly, the surface moves only a very short distance and can produce weak pressure fluctuations and a faint sound. If the drum is hit harder, its surface moves farther from its rest position, and the pressure increase can be greater. To the listener, the sound would be louder.

Sound pressure can also depend on the environment in which the source is located and the listener's distance from the source. The sound produced by the drum is louder two meters from the drum if it is in a small bathroom, than if it is struck in the middle of, for example, a football field. Generally, the farther one moves from the drum, the quieter it sounds. Also if there are hard surfaces that can reflect the sound (e.g. walls in a room), the sound will feel louder than if you heard the same sound, from the same distance, in a wide-open field. Sound pressure is often expressed in units called Pascal's (Pa). For further context, a healthy, young person can hear sound pressures as low as approximately 0.00002 Pa. A normal conversation produces a sound pressure of about 0.02 Pa. A gasoline-powered lawn mower can produce about 1 Pa. Sound can become painfully loud at levels around 20 Pa. The common sounds we hear have sound pressure over a wide range (0.00002 Pa-20 Pa). It can be inconvenient to work with such a broad range of sound pressures. Therefore, it is common to use a logarithmic scale to describe sound pressure, such as the Bel, or more commonly, the decibel (dB).

Sound pressure levels in decibels, dB or A-weighted decibels, dB(A), are based on a logarithmic scale and therefore are not added or subtracted by the rules of basic arithmetic. If one source emits a sound level of 90 dB, and a second source is placed beside the first, the combined sound level is 93 dB, not 180 dB. Noise levels can be added with the help of Table 2.

TABLE 2

Addition of Decibels

| Numerical difference between two noise levels [dB(A)] | Amount to be added to the higher of the two noise levels [dB or dB(A)] |
|---|---|
| 0 | 3.0 |
| 0.1-0.9 | 2.5 |
| 1.0-2.4 | 2.0 |
| 2.5-4.0 | 1.5 |
| 4.1-6.0 | 1.0 |
| 6.1-10 | 0.5 |
| 10 | 0.0 |

In a step, one can determine the difference between the two levels and find the corresponding row in the left hand column. One can find the number [dB or dB(A)] corresponding to this difference in the right hand column of the table. This number can be added to the higher of the two decibel levels. It can be helpful to remember that due to the logarithmic nature of the scale a change of 3 dB is equivalent to a doubling or halving of the sound energy; a change in 10 dB corresponds to a change in sound energy by a factor of 10, and 20 dB corresponds to a factor of 100 in sound energy.

Figure 2:
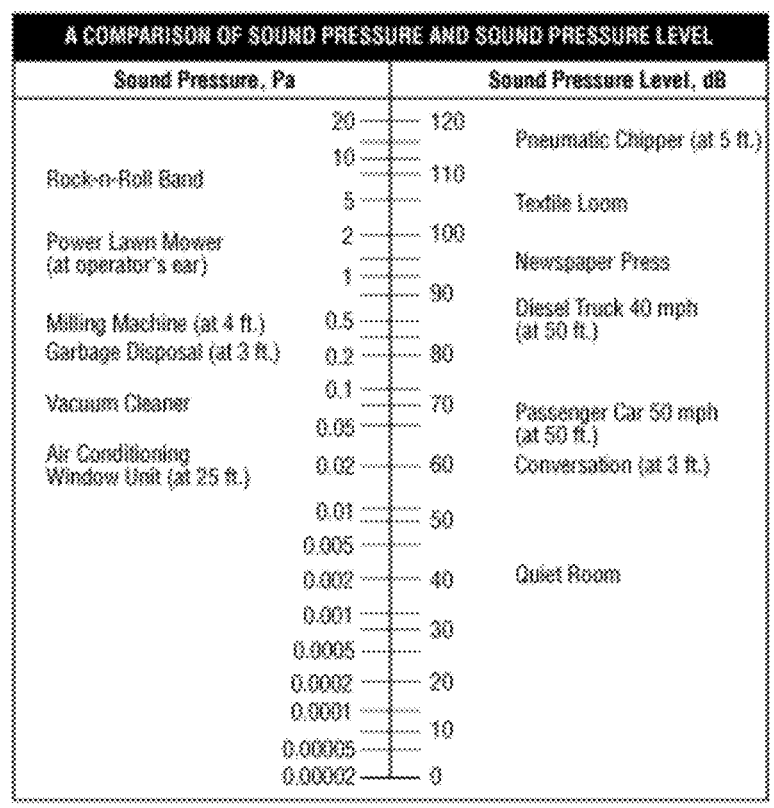
FIG. 2 compares the Pascal and decibel scales.

Sound pressure converted to the decibel scale can be considered the sound pressure level (Lp). FIG. 2 shows a comparison of sound pressures in Pascals and sound pressure levels in decibels (dB). The zero of the decibel scale (0 dB) is the sound pressure of 0.00002 Pa. This means that 0.00002 Pa is the reference sound pressure to which all other sound pressures are compared on the dB scale.

Figures 3, 4:
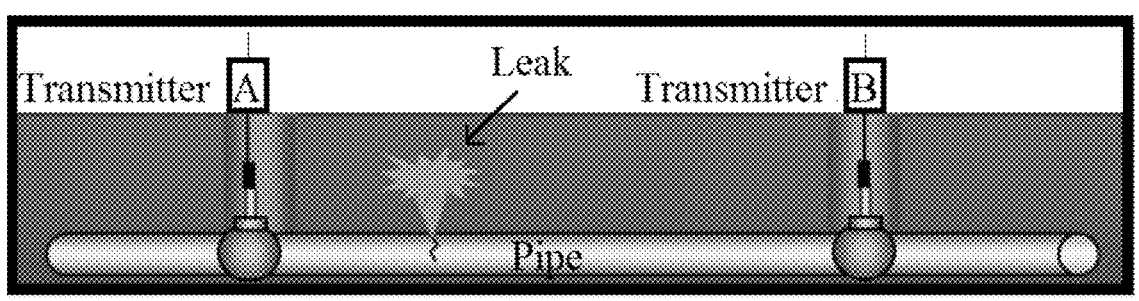
FIG. 3 compares sound power in decibels and Watts.
FIG. 4 depicts a leak in a pipeline.

Sound power can be described as the sound energy transferred per second from the noise source to the air. A noise source, such as a compressor or drum, has a given, constant sound power that does not change if the source is placed in a different environment. Power can be expressed in units called watts (W). For context, a typical whisper can generate a sound power of 0.1 microwatts (μW), a truck horn approximately 0.1 W, and a turbo jet engine about 100,000 W. Like sound pressure, sound power is often expressed as sound power levels in dB. FIG. 3 relates sound power in watts to sound power level in decibels. While the sound power is shown from one trillionth of a watt to one hundred thousand watts, the equivalent sound power levels range from 0 to 170 dB.

Because the sound power of a noise source can be constant and specific, it can be used to calculate expected sound pressure. The calculation can require detailed information about the environment of the noise source. A noise source with a lower sound power typically generates less sound pressure. For example, from the sound power of a compressor, the expected sound pressure and sound pressure level at a certain location and distance can be calculated. This information can be helpful in determining possible types of noise exposures and source locations.

Noise can be of different kinds depending on how it changes over time. For example, noise can be continuous, variable, intermittent, and/or impulsive. We will shed light on how this classification of noise depends on its change over time:

Continuous noise can be considered noise which remains constant and stable over a given time period. The noise of boilers in a power house can be relatively constant and could therefore be classified as continuous. Most manufacturing noise on the other hand can be variable or intermittent. Different operations and/or different noise sources can cause sound changes over time. Noise can be considered intermittent if there is a mix of periods of relative quiet and noise. Impulse or impact noise can be considered a very short burst of loud noise which may last for less than one second. Examples of such noises can be gun fire and/or the noises produced by punch presses.

The IUMS can utilize a noise analysis paradigm called time domain reflectometry (TDR). An advantage of TDR is the ability to analyze intermittent signals, i.e. where detected data can include a mix of relatively quiet periods and noisy periods. Advantageously, TDR can provide noninvasive detection of leaks in pipes.

Aspects of TDR in some embodiments can be implemented for diagnostic and/or monitoring purposes. It can achieve high measurement accuracy, high versatility, and robustness. Further, TDR can have relatively low implementation costs. Moreover, it can allow the carrying out of continuous, automated, remotely-controllable, and/or real-time measurements. In addition, known aspects of TDR can be implemented, for example for dielectric and/or spectroscopic characterizations of materials, fault diagnosis of wires, electrical fault detection, and/or soil moisture measurements.

TDR as implemented in the IUMS can allow quick and non-invasive inspection of underground metal pipes in a single measurement. For example, a simultaneous inspection of an entire length of considered pipe can be inspected even if it is hundreds of meters long. Moreover, differently from other traditional techniques for leak detection, the present system does not need specific operating conditions for the pipes. Therefore, present techniques can overcome limits of traditional leak detection techniques.

There can be several noise sources associated with underground water leaks, for example: partial obstruction of pipe bore (e.g. by a foreign object); consumption; pressure reducing valves (PRVs); partially closed valves (e.g. throttled or passing); close proximity of a main to a sewer and/or culvert pipe; changes in pipe diameter; water pumping; electrical interference; and noises due to water passing past pipe lining. The IUMS can be configured as a smart monitoring system to detect the noise as well as classify noises by type, identify its exact location (e.g. via satellite coordinates), generate a GIS map, and/or associate a digital image with the location. Providing a digital image can be useful for determine best modes to address an issue as well as to provide evidence of a state of the location prior to leakage. The clarity and strength of leakage noise can be very important for system integrity. Good leak noise should be clear, light and distinguishable, and/or strong and easy to detect. Leak noise can be considered poor if it is dull, muffled and difficult to distinguish, and/or weak and difficult to hear.

Figure 18:
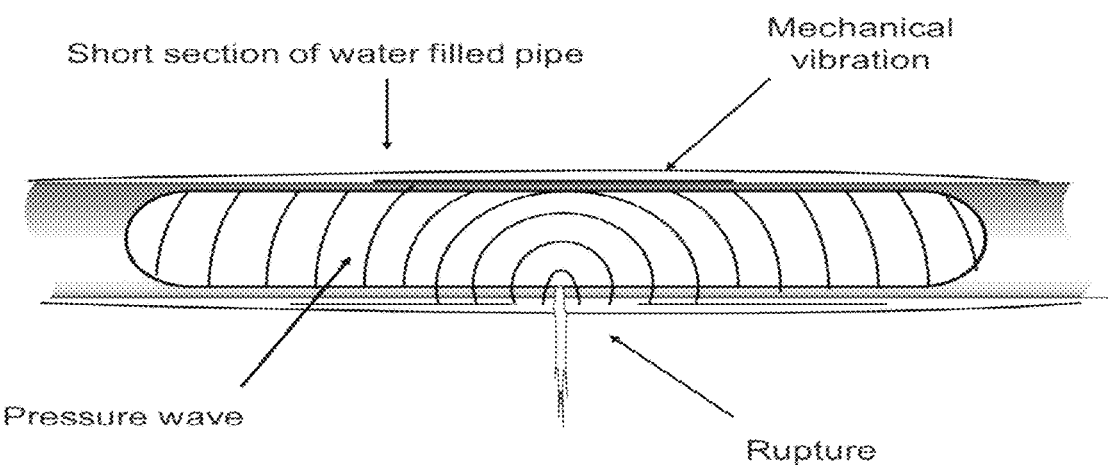
FIG. 18 depicts an exemplary water pipe and vibrations caused by a rupture in the pipe.
Figure 19:
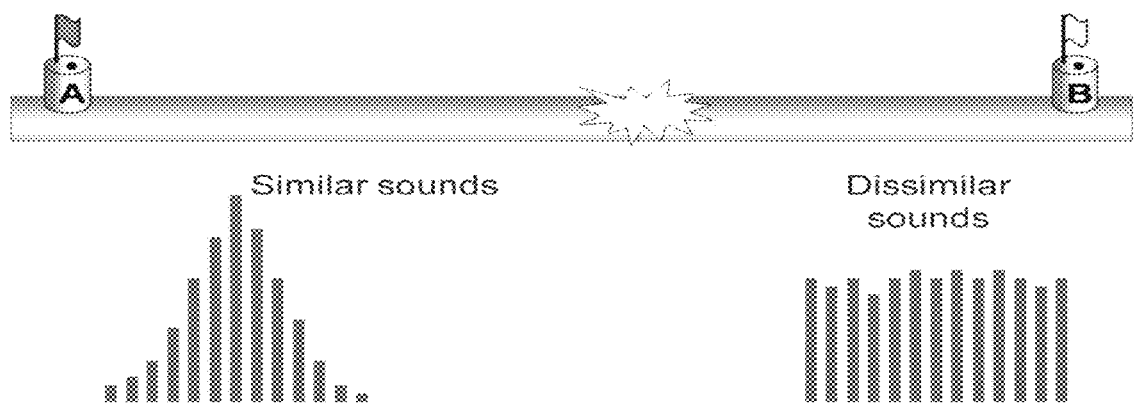
FIG. 19 depicts similar and dissimilar sounds in the pipe as detected at A and at B.

FIG. 18 shows schematically a short section of water filled pipe that has ruptured. Pressure waves and associated mechanical vibration resulting from the rupture are also shown. Different pipes materials can contribute to the quality of leak noise. Several factors can affect the quality of leak noise, as shown in Table 3.

TABLE 3

Factors affecting leak noise

| Factors producing good quality leak noise | Factors producing poor quality leak noise |
| --- | --- |
| High water pressure | Low water pressure |
| Hard backfill | Soft backfill |
| Small rupture | Split mains |
| Clean pipes | Encrusted pipes |
| Metallic pipes | Soft or lined pipes |
| Small diameter pipes | Large diameter pipes |

Leakage control programs typically involve two major steps, water audits and leak detection surveys. Water audits typically can involve the estimation of the quantity of water lost through the distribution system analyzed without questioning where the leaks are actually located. Leak detection surveys are generally aimed at the accurate localization of leaks. Leak detection surveys are often carried out through electro-acoustic techniques, for example, which can identify the sound of water escaping a pipe. In such surveys, engineers or other technical staff employs often can utilize specific listening devices, which can be put in contact with the pipeline through the accessible points of the water distribution system (e.g. valves, manholes, and/or fire hydrants). This is depicted in FIG. 4. It is possible to obtain a rough idea of the possible presence of leaks (or faults) and of their location. Leaks could, for example, be pinpointed by listening for leak sounds on the ground directly above the pipe.

Acoustic listening devices can be mechanical and/or electronic types (e.g., listening rods, geophones, and/or microphones). Such devices often include sensing mechanisms or sensing elements (e.g. piezoelectric materials) to detect the sound or vibration induced by water leaks. Leak noise correlators can be used for pinpointing leaks. These instruments can be based on a cross-correlation method, which can require measuring leak noise (either sound or vibration) at two pipe contact points that bracket the location of a suspected leak. Measured noise can be transmitted wirelessly to the correlator, which can determines the position of the leak based on, for example, the time shift of the maximum correlation of two leak signals, propagation velocity of leak noise, and/or the distance between sensing points.

Figure 5:
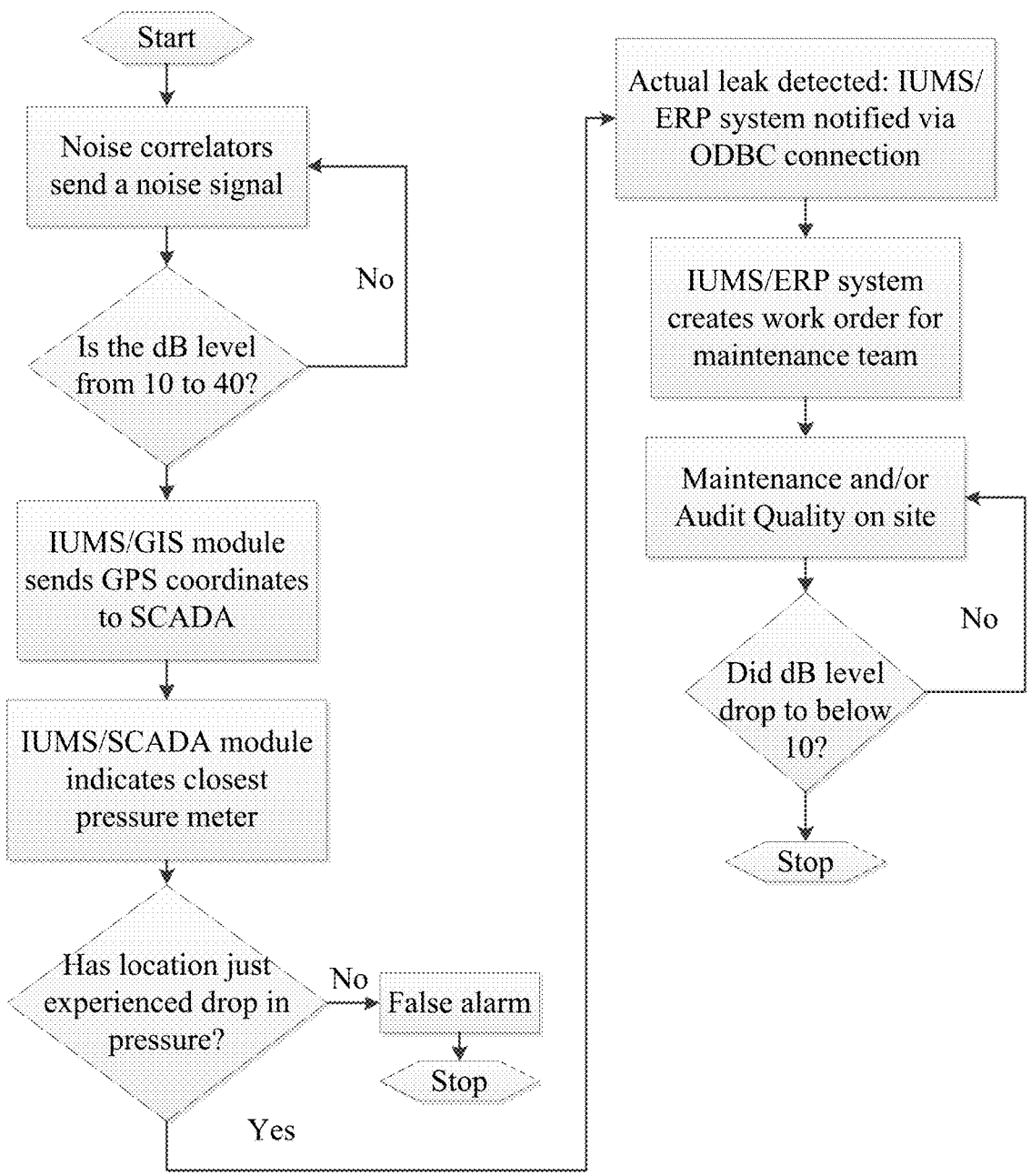
FIG. 5 depicts an exemplary method embodiment.
Figure 6:
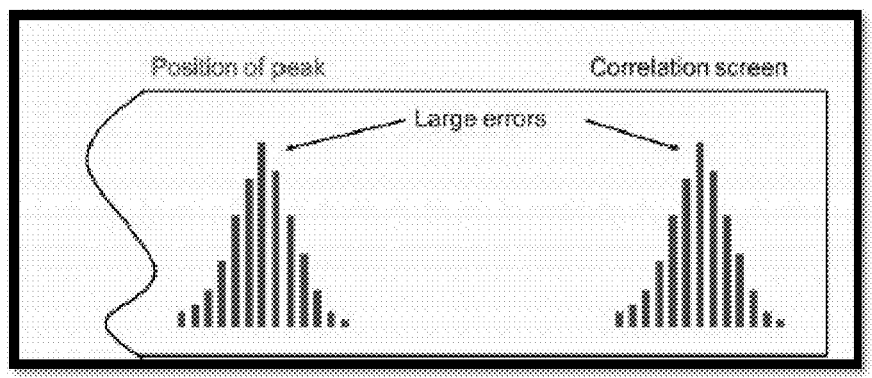
FIG. 6 depicts correlated peaks exhibiting large error.
Figure 7:
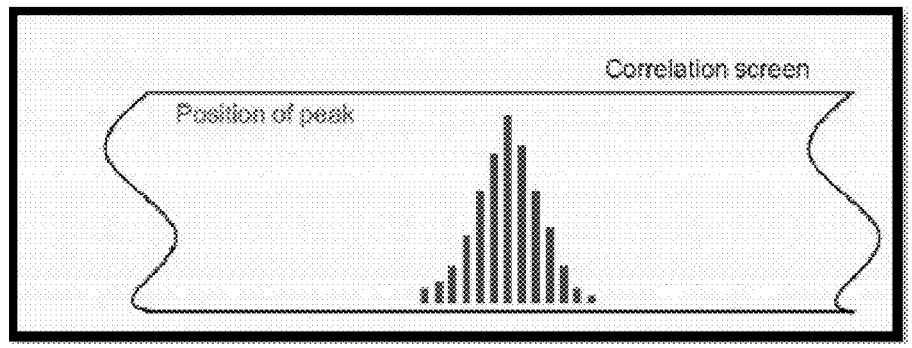
FIG. 7 depicts a correlated peak.

To improve accuracy of some embodiments in the diagnosis of a potential leak, IUMS can utilize an algorithm called herein the double voting approach (DVA). The DVA can include interlocking a leak detection signal coming from leak noise correlators. The signals can then be sent to a supervisory control and data acquisition (SCADA) system that can perform a simultaneity confirmation that can ensure whether there is a leak and can locate the particular spot in the piping system. FIG. 5 depicts a flow chart describing an exemplary method embodiment including the DVA.

Figure 24:
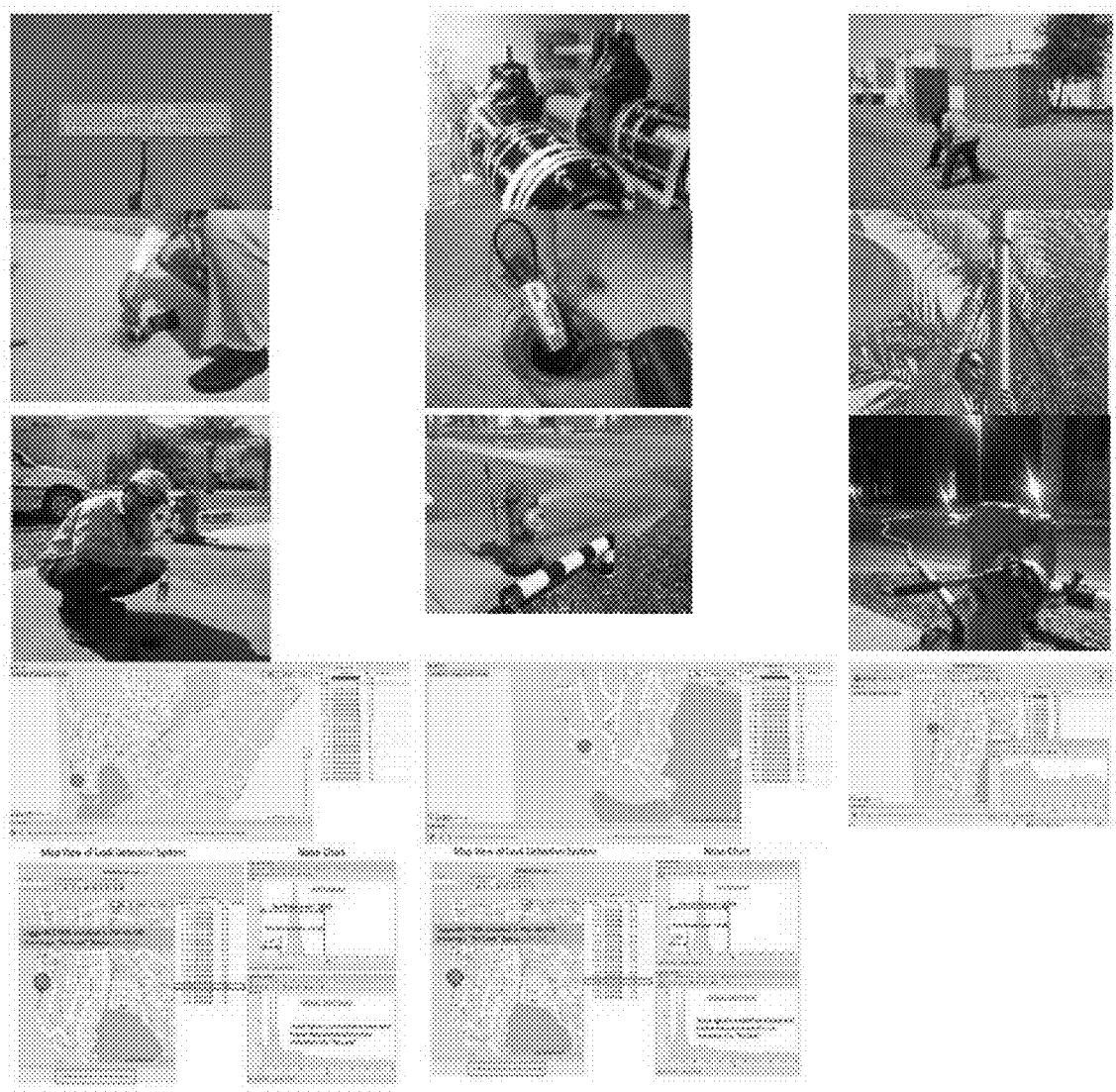
FIG. 24 depicts exemplary deployment of sensors and corresponding data on an interface.

The IUMS method and system can account for various sources of error. Such sources can include: poor measurement taking; incorrect pipe material entered; incorrect pipe diameter entered; parallel mains (which can correlate on different pipes); mixed materials; T-connections; and/or poor sensor contact (which can reduce signal intensity). As shown in the histograms on an exemplary interface in FIG. 24, the position of the peak can determine the possibility of an error in locating the position of a leak. Velocity can also be important since no-steady peaks can mean normal utilization of water. Small velocity errors can lead to large leak position errors. By the double voting approach, such errors can be accounted for.

In an exemplary implementation, the IUMS can be utilized for monitoring water production. In this aspect of the solution, a real-time data collector, events historian, and an alarms manager can be included together under an IUMS interface. The collection of production and distribution data for an RO facility can be done on 24/7 basis for example from an object linking and embedding for process control (i.e. OLE for process control, or simply OPC) server. The OPC can be installed on a computer interface that can also serve as the alarm and event collector. The OPC server can be configured to communicate with controllers, such as for example Allan Bradley PLCs.

Figure 11:
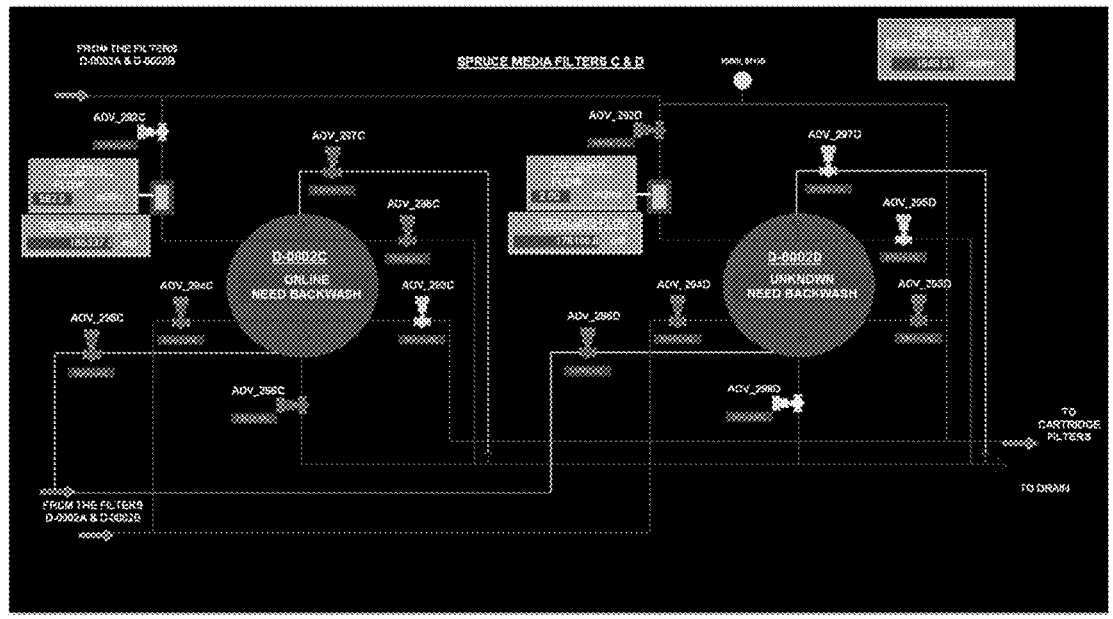
FIG. 11 depicts an exemplary interface showing pure control data about flow rate, pressures levels, temperature, vibrations rates.
Figure 12:
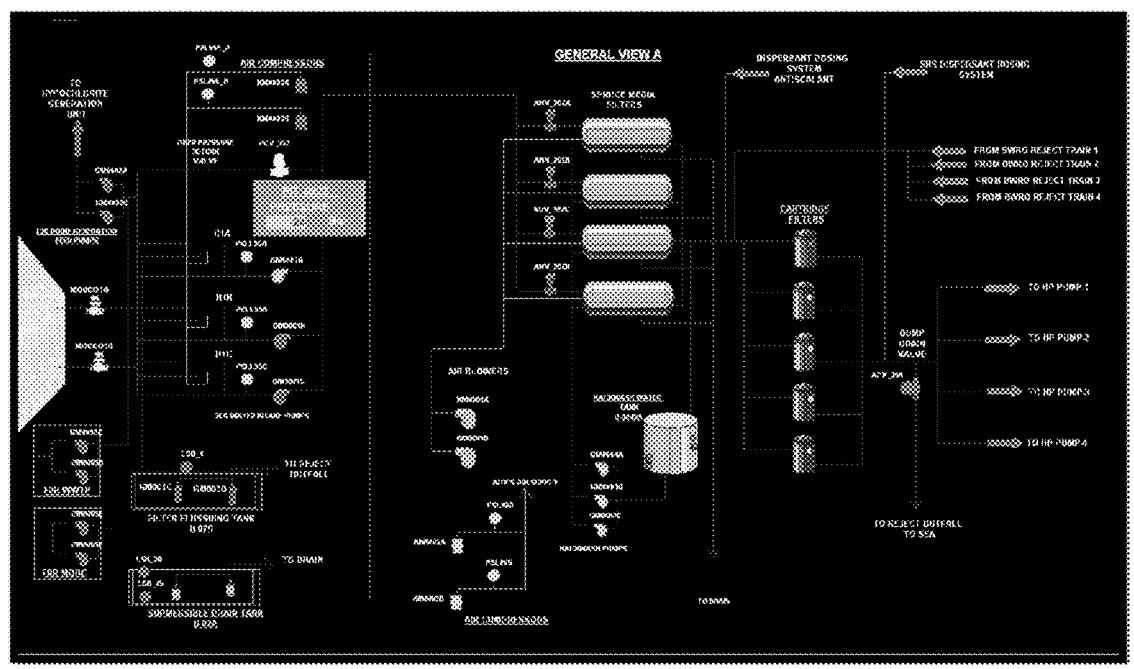
FIG. 12 depicts an exemplary interface showing pure control data about flow rate, pressures levels, temperature, vibrations rates.

Operators can monitor the water production process from discrete system in operations control rooms and/or remotely. Such are pure control data about flow rate, pressures levels, temperature, vibrations rates, etc. as shown on the below two FIGS. 11 and 12.

Figure 14:
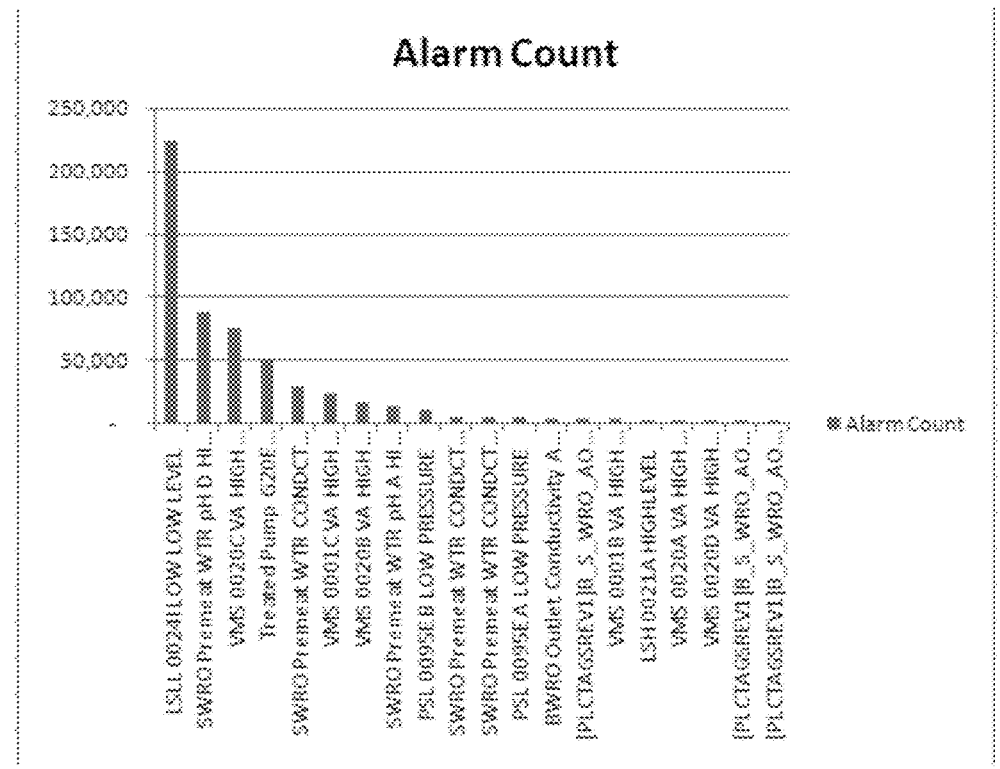
FIG. 14 depicts an exemplary interface showing graphical trends.

Alarm and event data generated by an interface can be collected directly from SQL tables where they are stored on an engineering workstation or database. Alarm messages, their counts, and graphical trends can be plotted as shown in FIGS. 13 and 14. Alarm and event data, as well as real-time data, can be buffered on by a client interface (e.g. A&E Collector and/or OPC-PI Interface) before being sent to the historian server.

An alarm manager can improve plant safety and alarm system operations. For example, an alarm manager can provide detailed analysis of nuisance, standing, and chattering alarms, as well as, alarm priorities, information on sequences of events, cause and effect alarms, and operator response versus active alarm durations. The alarm manager can also integrate alarms and events with process data for fast, effective incident reviews, as well as eliminate alarm printers and provide an archive permitting long-term alarm analysis and safety reviews. IUMS embodiments can also provide capabilities to develop in real-time graphical human-machine-interface-like environment within which a user may create graphical displays. Incident analysis and condition monitoring can be available for any tag, any data source, at any time. Moreover; trending SQL data using SQL functions can ensure any trending need can be fulfilled.

IUMS can include an historian server. The historian server can serve as the heart of a facilities monitoring solution by, for example, receiving data from PLCs. Once an interface (e.g. a PC or terminal) and associated software have been installed and configured, adding new points to the historian server as additional instrumentation become available can be a simple matter of exporting a tag list from, for example, Excel.

In an exemplary embodiment, a Microsoft SQL server can be utilized to store both the alarm and event data collected by the alarm manager as well as to store the downtime events detected by a downtime reporter. Microsoft SQL server is a standard relational database widely used across the world. However, this particular embodiment should not be considered a limitation of the invention and is provided here merely to more fully inform a person having ordinary skill in the art regarding possible embodiments.

A GIS server can be utilized and can be loaded with, for example, cross-referenced maps for a pipeline distribution network. The maps can include a plant and all parts of the network. For the RO example, the maps can include the RO plant, pipes that takes in sea water, and distribution pipes.

Connectivity to devices within the IUMS can be standardized. For example, the OPC standard mentioned above can be utilized. OPC or OLE for Process Control is a technology designed to bridge Windows-based applications and process control hardware. It is an open standard that permits a consistent method of accessing field data from plant floor devices. This method remains the same regardless of the type and source of data. OPC servers can provide a method for many different software packages to access data from a process control device, such as a PLC. Standardization can be advantageous for several reasons, such as for example precluding the need to build custom interfaces, or drivers, for each new feature or for using the same IUMS with a different utility and/or plant. The purpose of OPC is to define a common interface that is written once, and then reused by any business, SCADA, HMI, or custom software packages. Once an OPC server is written for a particular device, it can be reused by any application that is able to act as an OPC client. OPC servers can use Microsoft's OLE technology (also known as the Common Object Model, or COM) to communicate with clients. COM technology can permit a standard for real-time information exchange between software applications and process hardware to be defined.

The alarm and event data can be markedly different from time series data in that it can be multidimensional in nature. Whereas a single transaction for time-series data often contains three pieces of information (tag, timestamp, and/or value), an alarm and event message can typically contain many different kinds of information within a single transaction, which can necessitate the use of a relational database that can parse and store various kinds of message information so that it can be called back effectively.

Some embodiments of the IUMS can implement monitoring of maintenance performance and consumption by customers. Such embodiments can include, for example, SAP/PM, SAP/BW, a real-time data collector, an events historian, a GIS interface, and/or 360° images of locations archived and correlated with digital maps.

Figure 15:
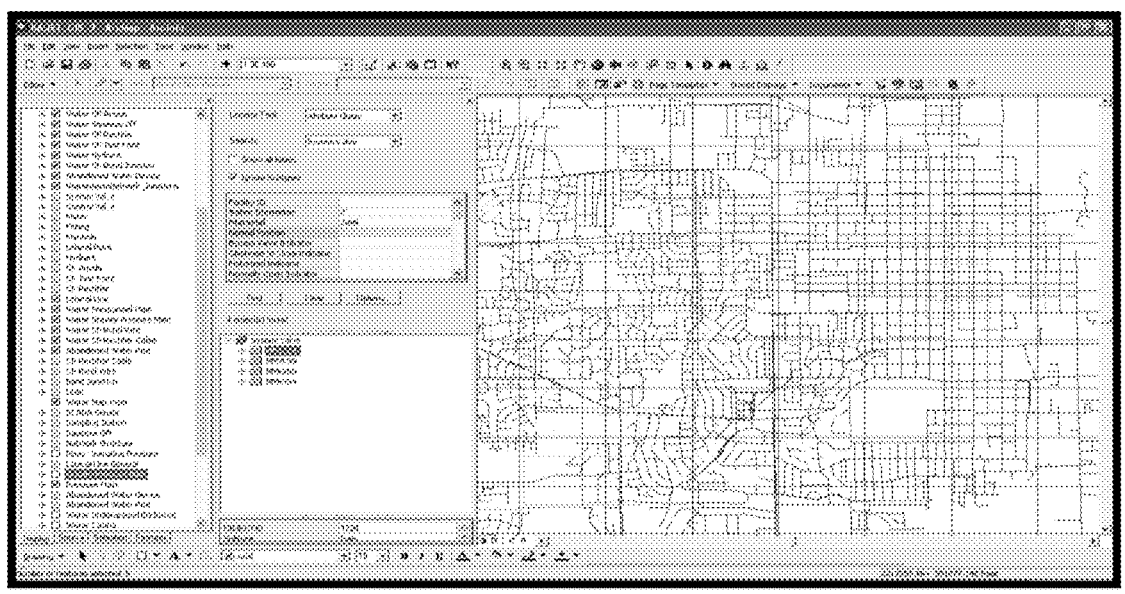
FIG. 15 depicts an exemplary interface showing GIS analysis regarding location data extracted from the system, including pipelines dimensions, type of materials used, nearest valves, meters on site, manholes.

When receiving a maintenance call, a work order can be created in the ERP system (e.g. SAP/PM) with an estimated time to complete and an estimated cost that can include required equipment, materials, and man-hours. The maintenance crew can be immediately dispatched to precise GPS-coordinates by a GPS-enabled device. In some embodiments, the following information can be provided to the field team before leaving, for example, to optimize the time and effort to complete the job: route analysis (e.g. shortest/fastest route); the precise repair location of a ruptured pipe to start the excavation; the volume of the leakage and when it began; and/or the nearest names and location of points of interest. An IUMS solution can further include searching capabilities in multiple layers with zoom in and zoom out functionality. Full details GIS analysis about location can be extracted including pipelines dimensions, type of materials used, nearest valves, meters on site, manholes, etc., as shown in FIG. 15.

Figures 16, 17:
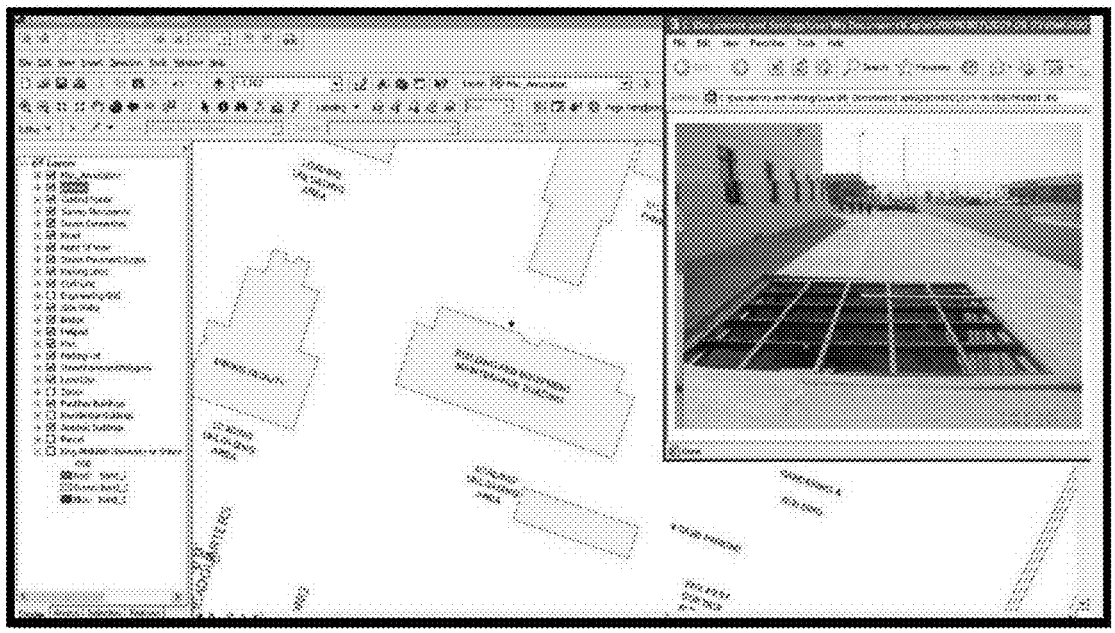
FIG. 16 depicts an exemplary interface showing a true digital picture displayed by clicking on a problem location in the map.
FIG. 17 depicts an exemplary web interface providing an intuitive environment through which plant operations can nominate root cause equipment and failure codes associated with the downtime.

For documentation purposes and further clarification prior to dispatching a maintenance crew, a true digital picture can be displayed. An IUMS interface can include a digital map configured correlate 360° images of such a location by clicking on the same problem location in the map as shown in FIG. 16. During maintenance work, the vehicle movement can be tracked from the control room or other remote location. When the job has been completed, the system can conduct a verification while the work crew is still on location.

A downtime module can connect directly to the connectivity layer and can identify interruptions to optimal plant throughput as well as provide a means for attributing events to a root cause. This module can be configured to monitor various plant areas for interruptions to production. Interruptions can be automatically logged, for example as either plant stoppages (actual downtime) or reduced throughput (effective downtime). An Internet or network interface can provide an intuitive environment through which plant operations personnel can nominate the root cause equipment and failure code associated with downtime. In an alternative embodiment, downtimes can be created manually for areas that do not support automatic data collection.

The downtime module can be configured to record equipment stoppages and/or reduced production rate. These are known as actual and effective downtimes respectively. These downtime types are exclusive to each other, that is, if both triggers were active simultaneously, then the system can be configured to record only the actual downtime. In other words, the system can be configured such that the effective downtime will only be recorded if the effective trigger is active and the actual trigger is not active.

An alarm manager can interface to all control systems (e.g. DCS, PLC) in a plant to capture alarm information, report alarm, summaries, and/or provide intelligent analysis tools. The alarm manager framework of capture, store, and analyze can ensure that a best practices approach to alarm management can be properly implemented and sustained over time.

Figure 20:
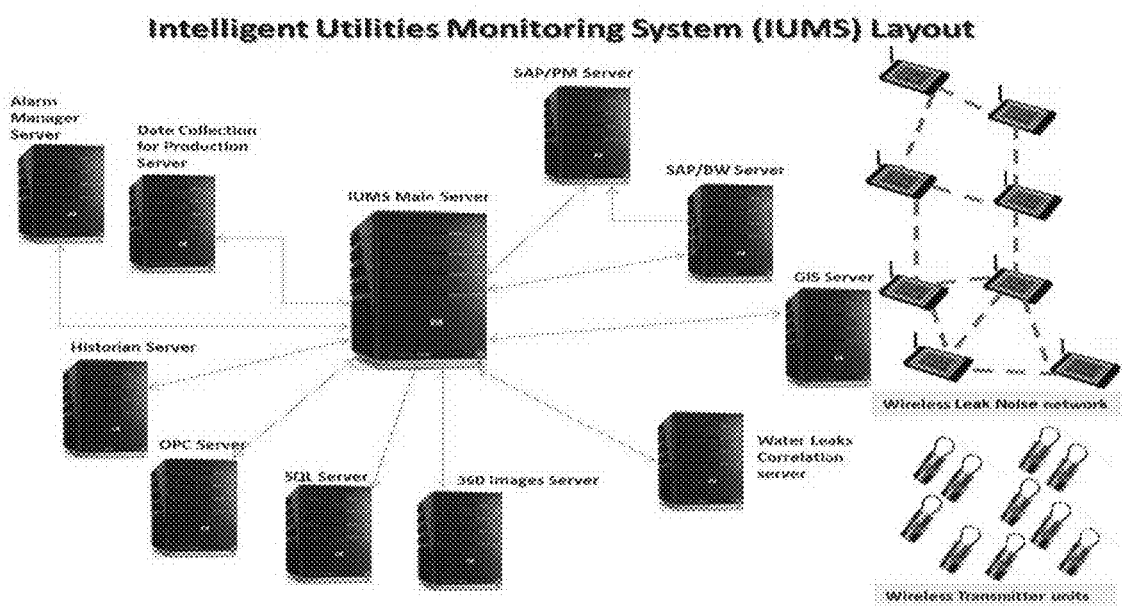
FIG. 20 depicts various components that can be included in the IUMS.
Figure 21:
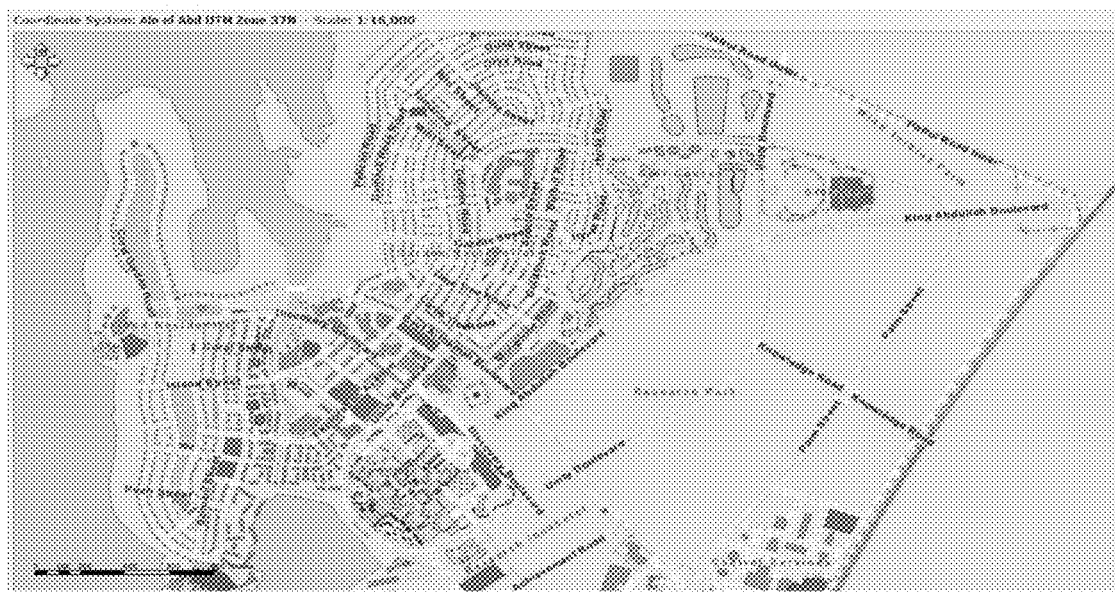
FIG. 21 depicts a real-time data presentation dashboard based on GIS maps for accurate underground visualization with 1 cm accuracy rates.
Figure 22:
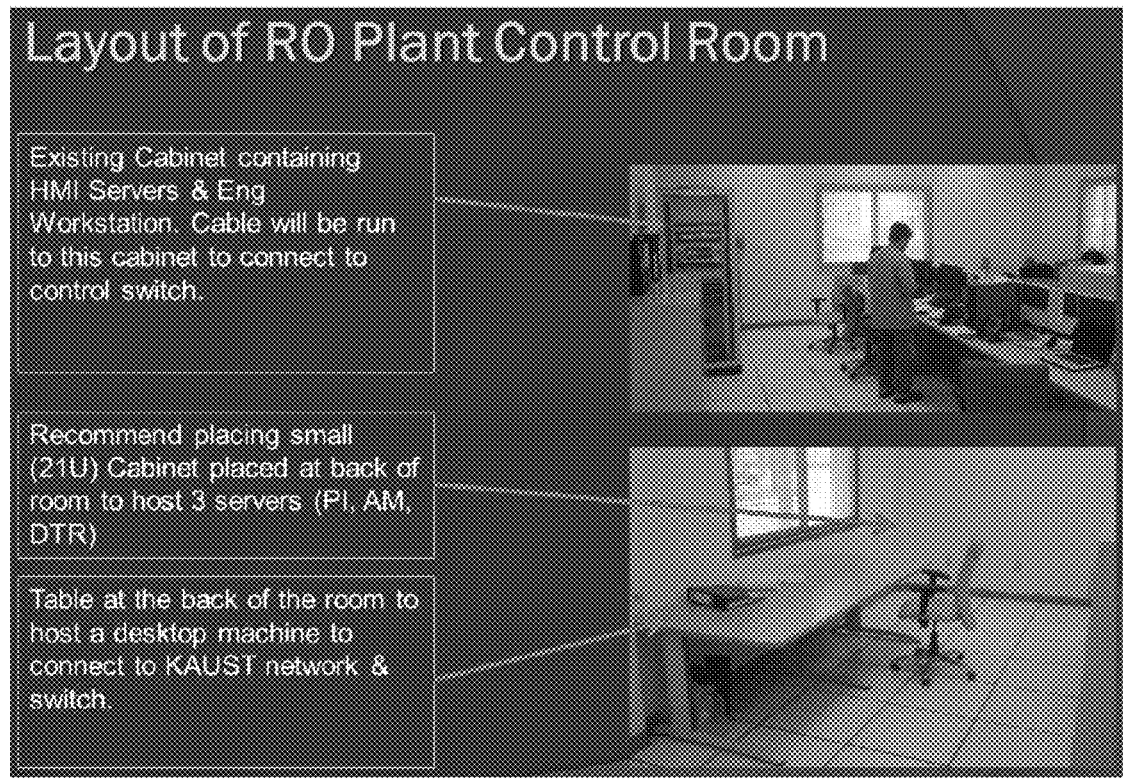
FIG. 22 depicts an exemplary configuration of a monitor and/or control room for implementing IUMS.
Figure 23:
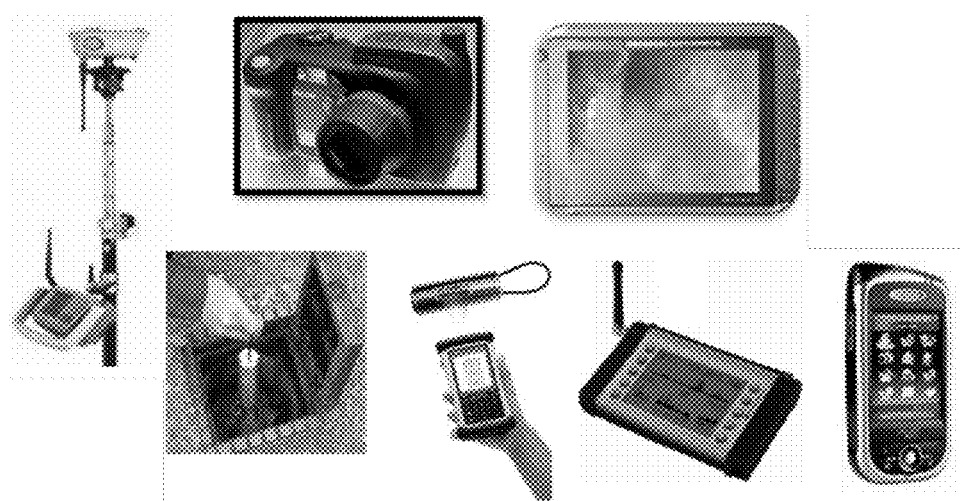
FIG. 23 depicts exemplary components that can be incorporated for implementing IUMS, including GIS cameras, GPS mobile stations, hand-held computing devices, and a Trimble Rover.

The IUMS can be implemented on a centralized server, in an enterprise network, and/or in a distributed network. The several servers mentioned can be implemented on several servers as depicted in FIG. 20 or on a single rack system, such as depicted in FIG. 22. The embodiment of FIG. 20 can include a set of approximately 11 servers, a wireless leak noise receivers network, and/or a wireless leak noise transmitter network. Real-time data presentation can be based on GIS maps for accurate underground visualization with 1 cm accuracy rates. Production data can be visualized on real-time process dashboards. A monitor and/or control room can be situated at the production plant or elsewhere. SAP and GIS servers can be located on site, or preferably, in a storage database and connected through IT architecture.

Some of the hardware that can be integrated with the IUMS, per each module, can include a leaks correlation module, a monitoring module, a GIS module, an SAP maintenance module, and/or a production monitoring module.

The leaks correlation module can include a leaks correlation server, combined radio transmitters with active sensors (e.g. accelerometers), a portable central LNC processor, which can also be implemented on a laptop or a personal computer. This module can further include a GSM or other telephony device and/or tablet, phablet interfaces, such as Palm Pilots, iPads, Samsung Galaxy, and/or similar personal devices. A radio logger with a long battery life or other means for powering (such as solar or radio powered) can be included. The wireless connectivity can be up to 250 m by utilizing components such as GPRS or WiFi with ALPHA Fixed Network. The IUMS can be configured to that a sensor noise threshold sensitivity of up to 3 μg.

The GIS module can include a GIS server, GIS cameras, and/or GPS mobile stations. An imaging rover can be incorporated with embodiments, such as a Trimble Rover, which can be a smart GIS/GPS device for surveying with an accuracy within approximately 1 cm.

The SAP maintenance module can include SAP/PM R3 for plant maintenance and/or SAP/BW for data warehousing. The 360° digital imaging module can include a digital images server.

The production monitoring module can include a IUMS master server, a data acquisition server, an OPC and/or SQL Server, an events historian server, an alarm manager server, UPS units, routers, hubs, and communication racks.

The embodiments may take the form of a hardware embodiment, a software embodiment, or an embodiment combining software and hardware. In one embodiment, the present invention takes the form of a computer-program product that includes computer-useable instructions embodied on one or more computer-readable media.

The various integrated techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Embodiments may include a general-purpose computer and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer.

The general-purpose computer may include a central processing unit (CPU) for executing instructions in response to commands, and a communication device for sending and receiving data. One example of the communication device is a modem. Other examples include a transceiver, a communication card, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network that can be utilized to implement various embodiments include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, a network can include a communications interface that allows software and data to be transferred between client devices, central servers, and other components. Examples of communications interfaces can include a modem, a network interface (such as, for example, an Ethernet card), a communications port, and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server.

Each of the following references is hereby incorporated by reference in its entirety.

Luna and Abdallah, "Control in Computing Systems: Part I," Computer-Aided Control System Design (CACSD), 2011 IEEE International Symposium on, vol., no., pp. 25-31.

Pizano-Moreno and Begovich, "Isolation of two non-concurrent leaks in water pipelines," Electrical Engineering Computing Science and Automatic Control (CCE), 2010 7th International Conference on, vol., no., pp. 164-169.

Pettersson et al., "ZigBee-Ready Wireless Water Leak Detector," Sensor Technologies and Applications, 2009. SENSORCOMM '09. Third International Conference on, vol., no., pp. 105-108, 18-23.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

What is claimed is:

1. An intelligent utility monitoring system for detection of leaks in a pressurized underground line, comprising: at least two acoustic sensors in contact with the pressurized underground line, wherein each of the at least two acoustic sensors are configured to detect a noise in the underground line having a noise level; an analyzer configured to (i) determine the noise level within the pressurized underground line and (ii) discriminate between noise below 10 dB or above 40 dB; and a processor comprising a correlator configured to wirelessly receive; from the at least two acoustic sensors, the noise in the underground line and to determine a location of a leak in the pressurized line based on correlation of the noise and configured to generate a valid alarm that is associated with a noise in a range of 10 dB to 40 dB; and determine a root cause for an event associated with a valid alarm.

2. The system of claim 1, wherein each of the at least two acoustic sensors has a wireless transmitter configured to communicate wirelessly with the correlator.

3. The system of claim 1, further comprising an acoustic impulse imparter in communication with pressurized line and wherein the processor is configured to compare the acoustic impulse with a partially reflected acoustic signal.

4. An intelligent utility monitoring system for monitoring a network of underground utility lines, comprising: a data collector configured to receive acoustic data based on real-time measurements of the underground utility line; an events historian configured to store the acoustic data on non-transitory media; an alarm and event manager configured to store alarm and event data on non-transitory media, wherein the alarm and event data is based on analysis of the acoustic data and associate valid alarms with noise in the range of 10 dB to 40 dB; an analyzer configured to determine the noise level within the underground utility line and discriminate between noise below 10 dB or above 40 dB; and determine a root cause for an event associated with a valid alarm; an interface configured to provide output based on the acoustic data and on the alarm and event data; and a server configured to store the acoustic data, and the alarm and event data on non-transitory media and further configured to provide a computer network for at least the events historian, the alarm and events manager, and the interface.

5. The system of claim 4, wherein the network of utility lines comprises water pipes, and wherein the data collector is configured to receive flow rate data and pressure data.

6. The system of claim 5, further comprising:
at least two acoustic sensors in contact with the water pipes, wherein each of the at least two acoustic sensors are configured to detect a noise having a noise level; and
a correlator configured to determine a location of a leak in the water pipes based on correlation of the noise.

7. The system of claim 6, wherein each of the at least two acoustic sensors has a wireless transmitter configured to communicate wirelessly with the correlator.

8. The system of claim 6, further comprising an acoustic impulse imparter in communication with the water pipes and wherein the server is further configured to compare the acoustic impulse with a partially reflected acoustic signal.

9. The system of claim 4, wherein the data collector is configured to receive temperature data.

10. The system of claim 4, wherein the data collector is configured to receive vibration data.

11. A method of intelligently monitoring an underground utility line, comprising the steps of:
transmitting an acoustic noise signal along the underground utility line;
measuring a first detection signal with a first sensor and a second detection signal with a second detector;
correlating the first and second detection signals and generating leak data and discriminating between noise below 10 dB or above 40 dB;
sending the leak data to a supervisory control and data acquisition system;
generating event data associated with the underground utility line;
generating alarm data for the underground utility line;
filtering out false alarms based on a predetermined criteria,
wherein the predetermined criteria comprises associating valid alarms with noise in the range of 10 dB to 40 dB; and
determining a root cause for an event associated with a valid alarm.

12. The method of claim 11, further comprising correlating the leak data with one or more locations on a digital map.

13. The method of claim 12, wherein the one or more locations comprises a surface location and a depth location.

14. The method of claim 12, further comprising automatically generating an optimized response plan based on the leak data and on the digital map.

15. The method of claim 11, further comprising logging leak data and generating predictions of potential leaks based on logged leak data.

* * * * *